(12) United States Patent
Yeo (10) Patent No.: US 8,746,989 B2
(45) Date of Patent: Jun. 10, 2014

(54) BOARD TO BOARD OPTICAL INTERCONNECT USING AN OPTICAL INTERCONNECT ASSEMBLY

(75) Inventor: Jong-Souk Yeo, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1695 days.

(21) Appl. No.: 11/974,692

(22) Filed: Oct. 15, 2007

(65) Prior Publication Data

US 2009/0097803 A1  Apr. 16, 2009

(51) Int. Cl.
*G02B 6/36* (2006.01)

(52) U.S. Cl.
USPC .......................................................... 385/89

(58) Field of Classification Search
USPC .......................................................... 385/89
See application file for complete search history.

(56) References Cited

U.S. PATENT DOCUMENTS

| | | | |
|---|---|---|---|
| 5,155,785 A * | 10/1992 | Holland et al. | ................ 385/89 |
| 5,631,988 A | 5/1997 | Swirhun et al. | |
| 6,619,853 B2 | 9/2003 | Grois et al. | |
| 6,619,858 B1 | 9/2003 | Lytel et al. | |
| 7,142,748 B1 * | 11/2006 | Yang | ................ 385/30 |
| 7,229,218 B2 | 6/2007 | Morris et al. | |
| 7,400,790 B2 * | 7/2008 | Fenwick et al. | ................ 385/14 |

OTHER PUBLICATIONS

Berger, Christopher et al., "High-density optical interconnects within large-scale systems"; IBM Research, Zurich Research Laboratory, pp. 1014; Rueschlikon, Switzerland, Oct. 28, 2002.
Wong, Henry, "Optics primed for box-level solutions", EETimes Online, Jul. 15, 2002, pp. 1-4, Tempe, Arizona.
Glebov, Alexei L., "Enabling Technologies for Board-Level Optical Interconnects", Advanced Optoelectronics Technology Department, Fujitsu Laboratories of America, Jan. 11, 2006, pp. 1-22, Sunnyvale, CA.

* cited by examiner

*Primary Examiner* — Uyen Chau N Le
*Assistant Examiner* — Hoang Tran (57) ABSTRACT

An optical interconnect assembly provides board to board interconnect in an electronic system. The optical interconnect assembly can include a plurality of optical fibers, having a connector disposed at the first ends, and a rigid optical mount disposed at the second ends. The rigid optical mount holds the optical fibers in alignment and in optical communication with a plurality of optical transducers mounted on the optical mount. Electrical contacts coupled to the optical transducers enable solder-attachment of one end of the optical interconnect assembly to a circuit board.

24 Claims, 5 Drawing Sheets

BOARD TO BOARD OPTICAL INTERCONNECT USING AN OPTICAL INTERCONNECT ASSEMBLY

BACKGROUND

Electronics systems, such as servers, typically include a number of printed circuit boards placed into a card cage or rack. A backplane is used to provide electrical interconnection between the circuit boards, and the circuit boards include connectors that mate into corresponding connectors of the backplane. Data can accordingly be transferred between circuit boards over the backplane via electrical signals.

As data bandwidths between circuit cards have increased, many difficulties with providing data transfer over a backplane have arisen. As data rates are increased, electromagnetic interference and crosstalk can become a problem, making the backplane design more difficult and expensive. Non-ideal characteristics presented by electrical connectors also prove increasingly problematic as data rates are increased.

Increasing numbers of parallel interconnections can be used to provide bandwidth increase, but this increases pin and component counts, as well as power consumption. Very large backplane connectors can also result in high insertion forces and reduced reliability.

Sometimes, auxiliary connections between boards have been used as well as backplane connections, including for example ribbon cables between connectors disposed on board front edge (the edge opposite the backplane). Of course, these auxiliary connections also face similar electrical design challenges as the backplane with respect to signal quality, electromagnetic interference, and other problems.

Increasingly, systems designers are turning to optical interconnect as an alternative to conventional electronic interconnects. Optical interconnects provide the potential for very high bandwidths while providing generally less electromagnetic interference generation and susceptibility than electrical interconnects.

While optical backplanes have been proposed, alignment of optical inputs and outputs from the boards to the backplane can be difficult. In part, the difficulty of alignment results from relatively low tolerance mechanical structures used in card cages. While electrical connectors are designed to accommodate these tolerances, providing the higher alignment desired in optical connectors tends to add significant cost and mechanical complexity to the card cage and connectors.

Obstacles to wider acceptance of optical interconnection also include the challenge of providing optical alignment at the connectors to avoid excessive losses through the connectors. Addressing these alignment issues can translate into complex mechanical structure and higher cost. Depending on the type of optical connectors, it can be difficult to install and remove cards from a system in the field. Accordingly, needs still exist for improved optical interconnection technologies.

BRIEF DESCRIPTION OF THE DRAWINGS

Features and advantages of the invention will be apparent from the detailed description which follows, taken in conjunction with the accompanying drawings which together illustrate, by way of example, features of the invention; and, wherein.

DETAILED DESCRIPTION OF EXAMPLE EMBODIMENTS

In describing embodiments of the present invention, the following terminology will be used.

The singular forms "a," "an," and "the" include plural referents unless the context clearly dictates otherwise. Thus, for example, reference to "a component surface" includes reference to one or more of such surfaces.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

Reference will now be made to the exemplary embodiments illustrated, and specific language will be used herein to describe the same. It will nevertheless be understood that no limitation of the scope of the invention is thereby intended.

Figure 1:
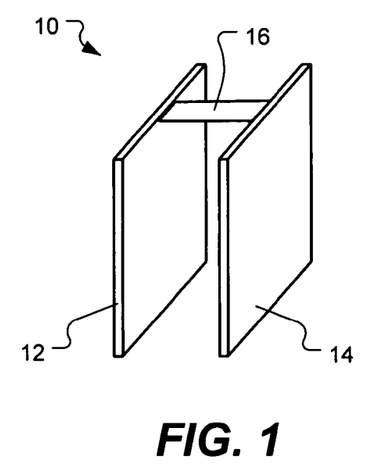
FIG. 1 is a perspective view illustration of an electronic system incorporating an optical interconnect assembly in accordance with an embodiment of the present invention.

FIG. 1 illustrates an electronic system incorporated an optical interconnect assembly in accordance with an embodiment of the present invention. The electronic system 10 includes a first circuit board 12 and a second circuit board 14. The first circuit board and second circuit board are interconnected by an optical interconnect assembly 16.

Figure 2:
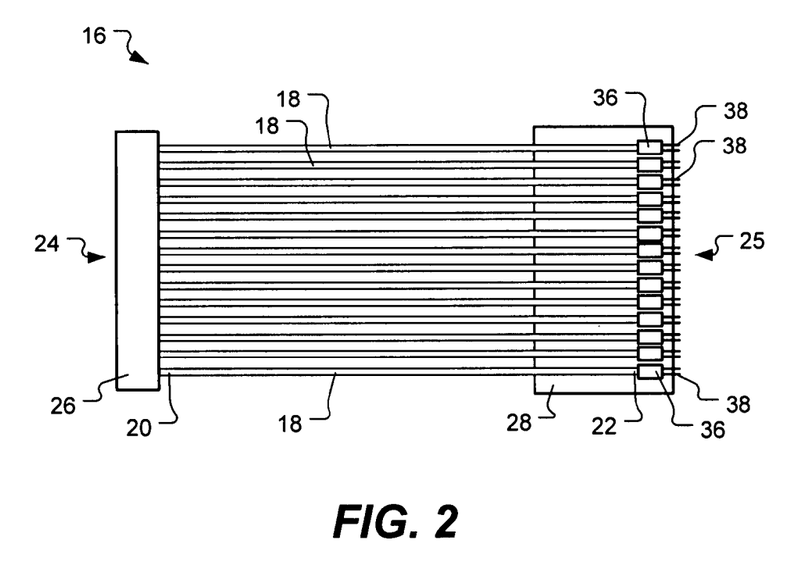
FIG. 2 is a top view illustration of one embodiment of the optical interconnect assembly shown in FIG. 1.

The optical interconnect assembly 16 is shown in further detail in FIG. 2. The optical interconnect assembly includes a plurality of optical fibers or fiber cables 18 extending longitudinally and having a plurality of first ends 20 and a plurality of second ends 22. The first ends define a first end 24 of the optical interconnect assembly, which may include a connector 26. The connector may, for example, be an optical connector as described further below. Although the optical fibers are shown here in the form of an optical ribbon cable, the optical fibers may alternately be in a bundle or other arrangement.

Figure 3:
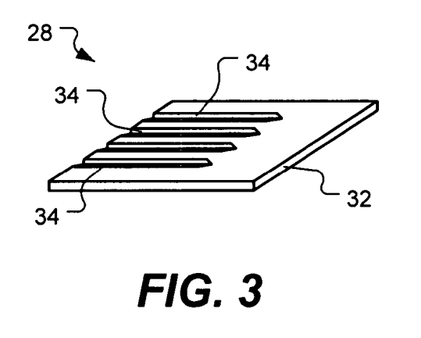
FIG. 3 is a detailed perspective view illustration of one embodiment of the rigid optical mount component of FIG. 2.

An optical mount 28 is attached to the second ends 22 of the optical fibers 18 and holds the second ends in alignment. For example, as shown in FIG. 3, the rigid optical mount 28 may include a silicon substrate 32 having v-grooves 34 disposed therein to receive the second ends of the optical fibers. The v-grooves may be machined or etched into the silicon substrate to guide fiber ends to coupling optics and active optoelectronic components such as detectors or light sources.

Returning to FIG. 2, a plurality of optical transducers 36 are mounted to the rigid optical mount 28. The optical transducers are positioned to optically communicate with the plurality of optical fibers at second ends 22, for example through the end or side of the optical fiber. While the optical transducers are shown here in the form of individual packages associated with each fiber, it will be appreciated that multiple transducers may be packaged together in a single package. A plurality of electrical contacts 38 are coupled to the optical transducers to electrically communicate with the optical transducers. The electrical contacts are arranged to enable solder-attachment, wire bonding, flip chip bonding with thruhole interconnects, and the like to a printed circuit board to define a second end 25 of the optical interconnect assembly 16. The specific electrical contact arrangement depends on the particular configuration of the optical components on the optical mount. During operation, power for the optical transducers 36 can be provided through the electrical contacts from the circuit board to which the optical interconnect assembly is connected.

The optical transducers 36 may include optical sources, including for example, vertical cavity surface emitting lasers (VCSELs), edge emitters, light emitting diodes, or arrays of modulators with a broadband light source. The optical transducers may also include optical detectors, including for example photodiodes and phototransistors. Using optical sources allows for data flow from the second end 25 of the optical interconnect assembly 16 to the first end 24. Conversely, using optical detectors allows for data flow from the first end 24 to the second 25. Both optical sources and optical detectors may be included to provide for bidirectional data flow, and is discussed in further detail below.

Figure 4:
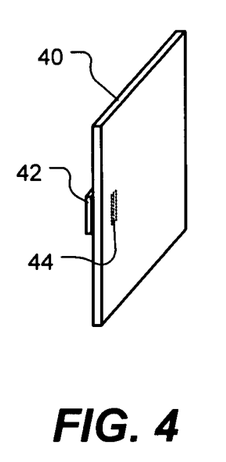
FIG. 4 is a perspective view illustration of a circuit board for use with an optical interconnect assembly in accordance with an embodiment of the present invention.

Use of an optical interconnect assembly 16 can be as follows. An electronic circuit board for use with the optical interconnect assembly is shown in FIG. 4. The board includes an optical receptacle 42 to mate with the first end 24 of a first optical interconnect assembly via the connector 26. The board also includes an electrical contact pattern 44 to mate with the second end 25 of a second optical interconnect assembly. Using the electrical contacts 38 at the second end 25 of the optical interconnect assembly 16, the second optical interconnect assembly may be electrically attached to the circuit board 14. For example, the electrical contacts may be any of through-hole pins, surface mount leads, solder bumps, or similar types of electrical contacts. The soldering permanently attaches the optical interconnect assembly to the circuit board, allowing the circuit board with attached optical interconnect assembly to be shipped as a single unit. The electrical contacts may include power connections to the optical transducers so the optical transducers are powered from the circuit board, as described further below.

Figure 5:
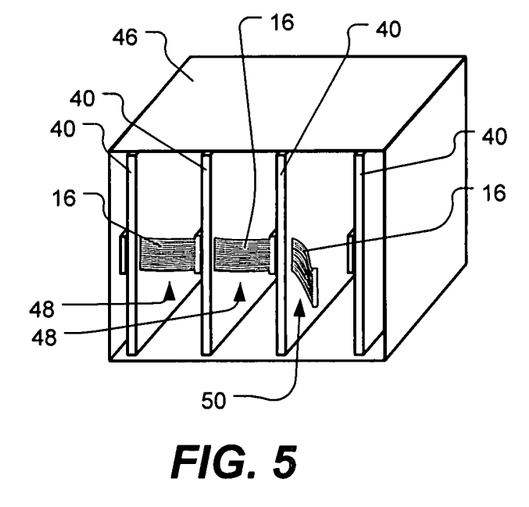
FIG. 5 is a perspective illustration of a card cage having a plurality of circuit boards as in FIG. 4 and using an optical interconnect assembly in accordance with an embodiment of the present invention.

As shown in FIG. 5, a plurality of circuit boards 40, each having optical interconnect assemblies 16 attached thereto may be field-installed into a card cage 46. Cards may be slid into the card cage, and then the optical interconnections made. The optical interconnections are made by flexing the optical interconnect assembly 16 to place the connector 26 at the first end 24 into position to be mated to the receptacle 42 of the adjacent card, and then mating the connector and the receptacle. This process can be repeated for each of the cards, until all of the interconnections are made. For illustration, two of the optical interconnect assemblies are shown in an installed positions 48, and one is shown in an uninstalled position 50.

Of course, while the above discussion has shown only a single optical interconnect assembly 16 in use between boards 40, it will be appreciated that boards may include multiple optical interconnect assemblies as just described. The optical interconnect assemblies can be positioned at various locations on the printed circuit boards, for example, toward the back, top, bottom, or on mid-planes, and oriented horizontally or vertically relative to the bottom plane of the card cage.

One advantage of the present system is that interconnections between the boards 40 can be easily made by a technician, as connecting the optical interconnect assembly 16 between boards simply involves mating the optical connector 25 to a corresponding receptacle 42. Accordingly, boards can be easily removed in the field (for example, for testing or replacement) by un-mating the appropriate connector and receptacle pair and removing the board.

Alignment issues are largely taken care of by the pre-alignment of the optical fibers 18 to the rigid optical mount 28 at the second end of the optical interconnect assembly 16. At the first end of the optical interconnect assembly, mis-alignment tolerant optics along with mechanical latching mechanisms can be used. Rather than using a complex optical connector to accommodate tolerance between adjacent boards 40, tolerance is accommodated by the optical fibers of the optical interconnect assembly. Accordingly, reduced cost may be obtained.

Advantage is also obtained by including the optical transducers 36 on the optical mount 28 as a part of the interconnect assembly 16. This helps to reduce difficulty of providing alignment between the optical fibers 18 and the optical transducers, since these components are mounted to the optical mount. This alignment can be controlled on the relatively small scale of the optical mount, and does not need to be controlled over the larger scale of the printed circuit board. Moreover, because connection to the circuit board is electrical via the electrical contacts 38, the soldered connection to the circuit board can tolerate higher alignment errors. The optical interconnect assembly may therefore be attached to the circuit board using a regular pick-and-place assembly operation.

Because the optical interconnect assembly 16 is not a part of a backplane, expensive and cumbersome optical connectors need not be included on the backplane. This also provides greater flexibility in the overall electronic system configuration, since the optical interconnect can be positioned at a top or bottom edge of the circuit board, at an outside edge (away from the backplane) of the circuit board, or even at a point in the interior of the circuit board.

The optical interconnect assembly 16 can be oriented either horizontally or vertically. This can allow positioning the optical interconnect assembly to present the smallest cross section area within the path of cooling air flow through the card cage.

Figure 6:
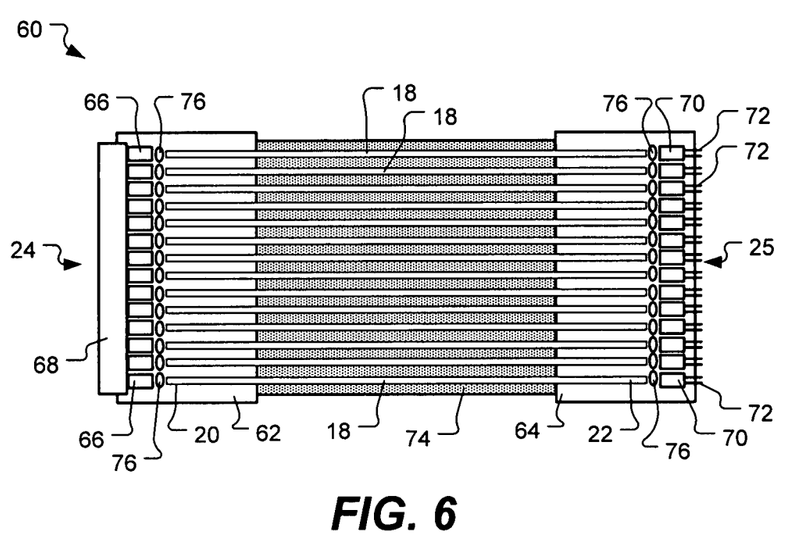
FIG. 6 is a top view illustration of an optical interconnect assembly in accordance with another embodiment of the present invention.

Another embodiment of an optical interconnect assembly is illustrated in FIG. 6. The optical interconnect assembly 60 includes a plurality of optical fibers 18, as described above. The first ends 20 of the optical fibers are attached to a first optical mount 62, and the second ends 22 of the optical fibers are attached to a second optical mount 64. The first optical mount includes a first plurality of optical transducers 66 positioned in optical communication with corresponding fiber ends and having electrical interconnection to an electrical connector 68. The second optical mount includes a second plurality of optical transducers 70 positioned in optical communication with corresponding fiber ends and having electrical contacts 72 arranged for electrical attachment to a circuit board.

If desired, the optical interconnect assembly 60 can include a support structure 74 to provide additional support for the optical fibers 18. For example, the support structure may be a flexible plastic or rubber material attached to the optical fibers.

The optical interconnect assembly 62 may also include coupling optics 76 interposed between the optical transducers 66, 70 and the fiber ends 20, 22 at either end or both ends of the optical fibers. Coupling optics may include, for example, microlens arrays and graded index lens. The coupling optics may be discrete components mounted to the optical mounts 62, 64 or may be an integral part of the optical mounts.

Use of the optical interconnect assembly 60 to interconnect boards is similar as described above in conjunction with FIG. 5, except that the electrical connector 68 provides an electrical connection, for example, a multi-pin connection, rather than an optical connection. Accordingly, no optical alignment between the optical interconnect assembly and the circuit boards is used.

Data communication can be provided between circuit boards 40 in either direction, depending on the construction of the optical interconnect assembly. For example, FIG. 7 illustrates in schematic form an optical interconnect assembly 102 which provides bi-directional communications between a first board 104 and a second board 106.

Data may flow from the first board 104 to the second board 106 as follows. An electrical format signal 108 comes from the first board, passing through electrical contacts 110 onto the optical interconnect assembly 102 and into an optical source 112 included within the optical interconnect assembly. The optical source converts the signal from electronic format into optical format, and launches the optical format signal 114 into an optical fiber 116. The optical format signal passes through an optical connector 118 on the optical interconnect assembly which is mated to an optical receptacle 120 on the second circuit board. The second circuit board accepts the optical signal, and uses an optical detector 122 mounted on the second board 106 to convert the signal back into electronic format 124.

Data flow from the second board 106 to the first board 104 is as follows. An electrical format signal 126 on the second board is converted into an optical format signal 130 by an optical source 128. The optical format signal passes through the receptacle 120 and the connector 118 into an optical fiber 116 of the optical interconnect assembly 102. The optical signal is received by an optical detector 132 on the optical interconnect assembly and converted back into an electrical format signal 134. The electrical format signal is passed through an electrical contact 110 onto the first circuit board.

Figure 7:
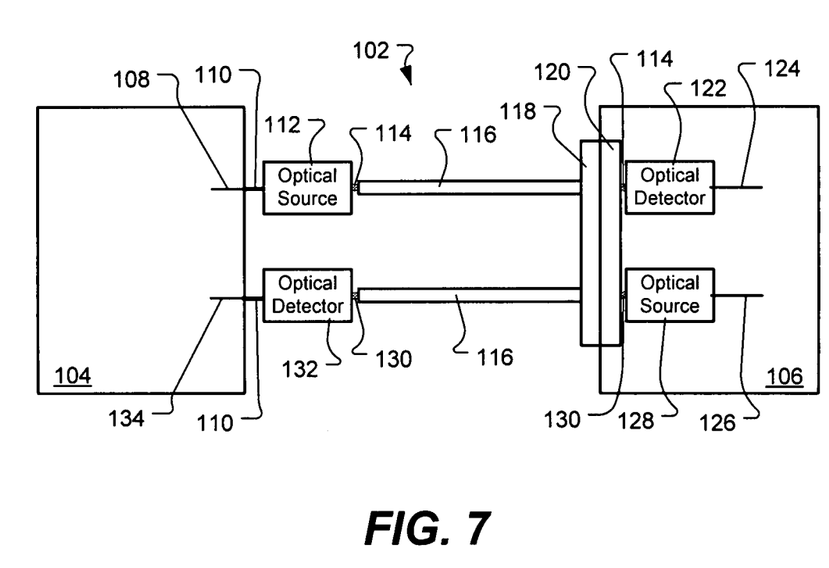
FIG. 7 is a schematic view illustration of an optical interconnect assembly connected between two circuit boards in accordance with an embodiment of the present invention.

Of course, while only one data path in each direction has been illustrated in FIG. 7, it will be appreciated that multiple data paths can be provided when multiple fibers are used in the form of parallel optical interconnects. Furthermore, multiple data paths may be provided within a single fiber using wavelength division multiplexing.

Figure 8:
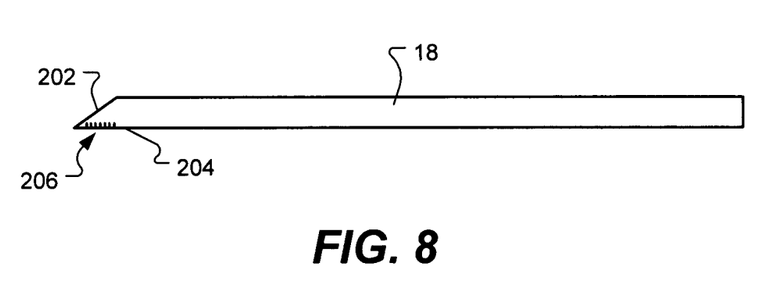
FIG. 8 is a detailed side view illustration of an optical fiber end in accordance with an embodiment of the present invention.

Turning to the details of the optical fiber to optical transducer interface on the optical interconnect assembly, optical signals from the fiber can be coupled into the optical transducers with proximity or butt coupling, grating coupling, or the like. FIG. 8 illustrates a detailed illustration of one embodiment. The fiber 18 may include a cut end 202 at an angle (e.g., about 45 degrees) having a reflective surface disposed thereon. This allows light to be directed into and out of the side 204 of the fiber where cladding layer is removed. The fiber may also include a grating 206 to provide optimized coupling condition for a given wavelength or to provide wavelength selectivity for use in wavelength division multiplexing. For example, a single laser may be interfaced to multiple modulators to allow for wavelength division multiplexing.

Figure 9:
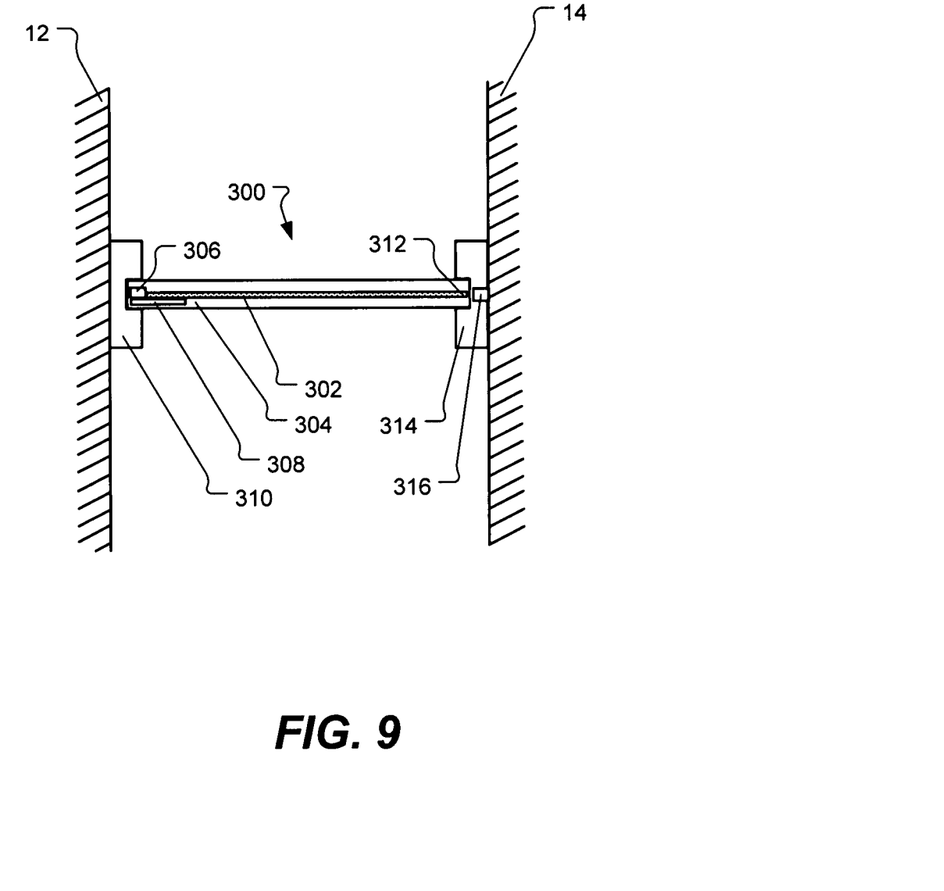
FIG. 9 is a side cross section view illustration of an optical interconnect assembly coupled between two circuit boards in accordance with another embodiment of the present invention.

FIG. 9 illustrates another embodiment of the present invention, showing a optical interconnect assembly 300 installed between two circuit boards 12, 14. The optical interconnect assembly can be slid into place between the circuit boards to provide optical interconnection between the boards. The optical interconnect assembly includes a plurality of optical fibers 302, coupled to a rigid optical mount 304, having optical transducers 306 mounted thereon at one end, for example as described above. The optical interconnect assembly slides into a receptacle 310 on the board to provide electrical contact between the optical transducers and electronics on the first board 12. The rigid support structure 304 helps to provide suitable rigidity to the overall assembly, making it easier to slide the optical interconnect assembly into position.

The opposite end of the optical interconnect assembly is received by an optical receptacle 314 on the second board 14. The optical interconnect assembly includes optical interfaces 312 disposed at the ends of the optical fibers to optically couple with optical transducers 316 mounted on the second board.

Figure 10:
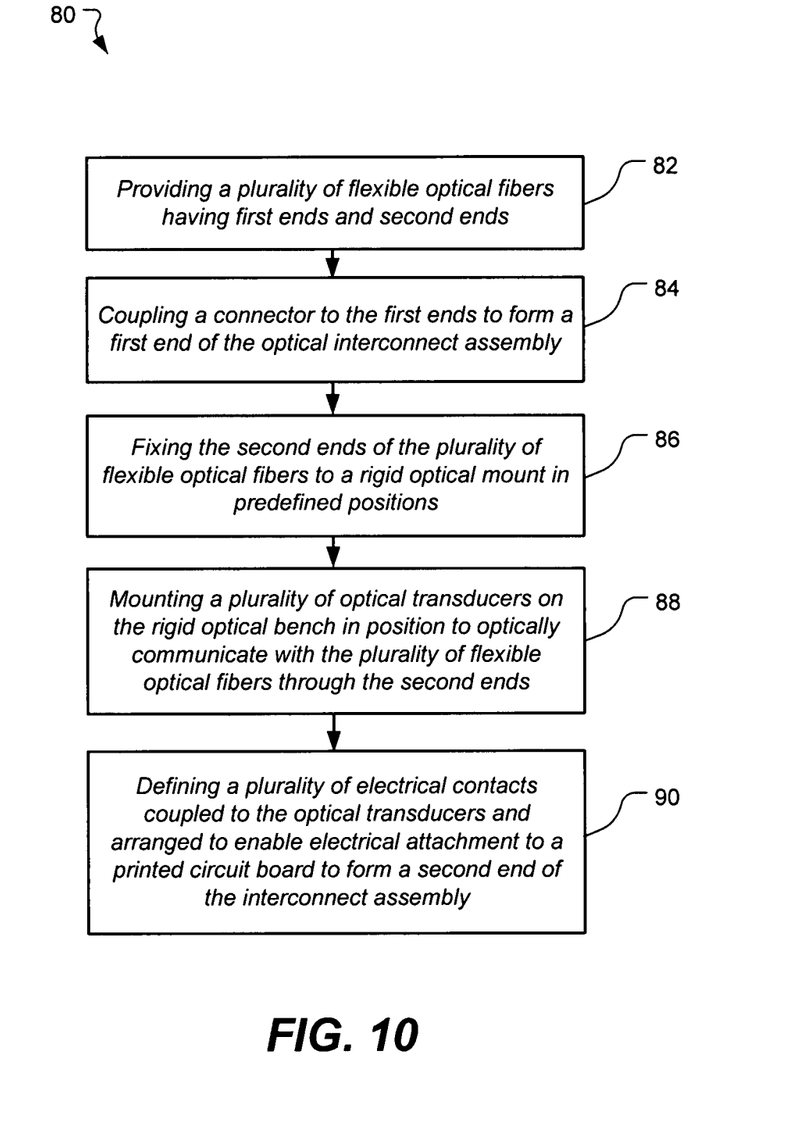
FIG. 10 is flow chart of a method of making an optical interconnect assembly in accordance with an embodiment of the present invention.

A method of making an optical interconnect assembly is described in conjunction with the flow chart in FIG. 10. The method 80 can include providing 82 a plurality of optical fibers having first ends and second ends. For example, the optical fibers may be provided in a ribbon or bundle. Individual optical fibers may be cut to length and gathered together to form a bundle or ribbon.

The method 80 can also include coupling 84 a connector to the first ends to form a first end of the optical interconnect assembly. For example, an optical connector may be coupled to the first ends. The first ends may be polished before or after being placed into the optical connector, depending on the type of optical connector used.

Another operation of the method 80 is fixing 86 the second ends of the plurality of optical fibers to a rigid optical mount in predefined positions. For example, as described above, the rigid optical mount may be a silicon substrate having v-grooves to hold the optical fibers in position.

Further operations can include mounting 88 a plurality of optical transducers on the rigid optical mount in position to optically communicate with the plurality of optical fibers through the second ends. For example, the optical transducers can be mounted by soldering, adhesive, or other techniques. The optical transducers can include optical sources, optical detectors, or combinations of optical sources and optical detectors.

Yet another operation of the method 80 can include defining 90 a plurality of electrical contacts coupled to the optical transducers and arranged to enable solder-attachment to a printed circuit board to form a second end of the interconnect assembly. For example, the electrical contacts may be through-hole pins, surface mount leads, solder balls, or the like. The electrical contacts may be integral to the optical transducers, or the electrical contacts may be formed separately on the optical mount and electrically coupled to leads on the optical transducers.

If desired, the optical fibers may be attached to a support structure, such as a plastic strip to provide additional protection to the optical fibers.

As mentioned above, the second end of the completed optical interconnect assembly may be soldered to a circuit board as a part of manufacturing the circuit board. For example, the optical interconnect assembly may be automatically attached the circuit board using conventional pick-and-place and reflow soldering equipment.

Summarizing and reiterating to some extent, an optical interconnect assembly in accordance with embodiments of the present invention provides numerous advantages for optical interconnect within an electronic system. The optical interconnect assembly is pre-aligned on one end, helping to reduce the difficulties associated with maintaining optical alignment in the system. Furthermore, connection and disconnection of the optical interconnect is easy, allowing a technician to install and remove circuit boards from a system in the field. Flexible fibers can accommodate large mechanical tolerance between adjacent circuit boards. The resulting optical interconnections can provide significantly higher data bandwidth as compared to electronic connections.

An additional benefit of providing high performance optical interconnects associated with the board, rather than the card cage or backplane is that optical interconnects can be a value-added functionality provided as an upgrade or option to users when an electronic system is sold.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An optical interconnect assembly for providing board to board interconnect in an electronic system, comprising
    a plurality of flexible optical fibers forming a positionable optical interconnect, the optical fibers having a plurality of first ends and a plurality second ends;
    a connector coupled to the plurality of first ends to define a first end of the interconnect assembly;
    a first rigid optical mount attached to the second ends, the second ends being held in alignment by the rigid optical mount;
    a plurality of optical transducers mounted on the rigid optical mount in position to optically communicate with the plurality of flexible optical fibers through the second ends; and
    a plurality of electrical contacts coupled to the optical transducers to electrically communicate with the optical transducers and arranged to enable electrical attachment substantially perpendicular to the plane of a printed circuit board to define a second end of the interconnect assembly.

2. The optical interconnect assembly of claim 1, wherein the plurality of flexible optical fibers is in a bundle.

3. The optical interconnect assembly of claim 1, wherein the plurality of flexible optical fibers is a fiber optic ribbon cable.

4. The optical interconnect assembly of claim 1, wherein the plurality of optical transducers comprises an optical source.

5. The optical interconnect assembly of claim 1, wherein the plurality of optical transducers comprises an optical detector.

6. The optical interconnect assembly of claim 1, wherein the plurality of optical transducers comprises at least one optical source and at least one optical detector.

7. The optical interconnect assembly of claim 1, wherein the connector comprises an optical connector.

8. The optical interconnect assembly of claim 1, further comprising coupling optics interposed between the second ends of the optical fibers and the optical transducers.

9. The optical interconnect assembly of claim 1, wherein the optical fibers further comprise gratings disposed on a side of the optical fibers configured to couple light of a selected wavelength into and out of the optical fiber.

10. The optical interconnect assembly of claim 1, further comprising:
    a second rigid optical mount attached to the first ends, the first ends being held in alignment by the rigid optical mount;
    a second plurality of optical transducers mounted on the second rigid optical mount in position to optically communicate with the plurality of flexible optical fibers through the first ends, wherein the second plurality of optical transducers are in electrical communication with the connector, wherein the connector is an electrical connector.

11. The optical interconnect assembly of claim 1, further comprising a support structure coupled to the optical fibers.

12. The optical interconnect assembly of claim 1, wherein the support structure is flexible.

13. The optical interconnect assembly of claim 1, wherein the first rigid optical mount comprises v-shaped grooves disposed therein to receive the second ends of the optical fibers.

14. The optical interconnect assembly of claim 1, wherein the electrical contacts are selected from the group consisting of solder bumps, through hole pins, surface mount leads, and combinations thereof.

15. The optical interconnect assembly of claim 1, wherein the electrical contacts are configured to couple power to the optical transducers.

16. A method of optically interconnecting circuit boards in an electronic system, comprising:
    providing a optical interconnect assembly in accordance with claim 1;
    electrically attaching the second end of the optical interconnect assembly to a first circuit board; and
    connecting the first end of optical interconnect assembly to a second circuit board.

17. The method of claim 16, further comprising flexing the optical interconnect assembly to position the connector for connecting to the second circuit board.

18. The method of claim 16, further comprising powering the optical transducers from the first circuit board.

19. The method of claim 16, further comprising communicating data from the first circuit board to the second circuit board via the optical interconnect assembly.

20. The method of claim 16, further comprising communicating data from the second circuit board to the first circuit board via the optical interconnect assembly.

21. A method of making an optical interconnect assembly for providing board to board interconnect in an electronic system independent of fixing the position of each board, comprising:
    providing a plurality of flexible optical fibers having first ends and second ends;
    coupling a connector to the first ends to form a first end of the optical interconnect assembly;
    fixing the second ends of the plurality of flexible optical fibers to a rigid optical mount in predefined positions;

mounting a plurality of optical transducers on the rigid optical mount in position to optically communicate with the plurality of flexible optical fibers through the second ends; and defining a plurality of electrical contacts coupled to the optical transducers and arranged to enable solder-attachment substantially perpendicular to the plane of a printed circuit board to form a second end of the interconnect assembly.

22. The method of claim 21, further comprising attaching the plurality of flexible optical fibers to a support structure.

23. The method of claim 21, further comprising soldering the second end of the optical interconnect assembly to a first circuit board.

24. The method of claim 22, further comprising connecting the first end of the optical interconnect assembly to a second circuit board.

* * * * *

UNITED STATES PATENT AND TRADEMARK OFFICE
CERTIFICATE OF CORRECTION

PATENT NO.        : 8,746,989 B2
APPLICATION NO.   : 11/974692
DATED             : June 10, 2014
INVENTOR(S)       : Yeo Page 1 of 1

It is certified that error appears in the above-identified patent and that said Letters Patent is hereby corrected as shown below:

In the Claims

Column 7, line 38, Claim 1, delete "plurality" and insert -- plurality of --, therefor.

Signed and Sealed this
Eleventh Day of November, 2014

Michelle K. Lee
*Deputy Director of the United States Patent and Trademark Office*